United States Patent [19]
Deragne
[11] 4,164,344
[45] Aug. 14, 1979

[54] HYDRAULIC CLAMPING APPARATUS

[76] Inventor: Maurice M. Deragne, 30 Rue Chazière, Lyons, France, 69004

[21] Appl. No.: 864,904

[22] Filed: Dec. 27, 1977

[30] Foreign Application Priority Data

Dec. 30, 1976 [FR] France ........ 76 39850

[51] Int. Cl.[2] ........ B23Q 3/08
[52] U.S. Cl. ........ 269/27
[58] Field of Search ........ 269/20, 24, 27, 31-32; 92/33

[56] References Cited

U.S. PATENT DOCUMENTS

| | | | |
|---|---|---|---|
| 3,362,301 | 1/1968 | Kohlitz | 269/24 X |
| 3,572,216 | 3/1971 | Seesody | 92/33 |
| 3,948,502 | 4/1976 | Waller et al. | 269/27 |

FOREIGN PATENT DOCUMENTS

| | | | |
|---|---|---|---|
| 2004137 | 2/1971 | France . | |
| 320364 | 3/1972 | U.S.S.R. | 269/32 |

*Primary Examiner*—Robert C. Watson
*Attorney, Agent, or Firm*—Dowell & Dowell

[57] ABSTRACT

The present invention is directed to apparatus for clamping work pieces in which the clamping element is locked in a given position by a novel mechanism comprising at least one dog on a piston connected to the element and one or more recesses defined within a cylinder in which the piston is otherwise movable. In preferred embodiments, the recesses are formed in a base portion which extends into the cylinder and defines the lower limit of axial travel and the clamping position of the piston. A dog is also formed on the upper end of the piston which is engageable with a recess in a cover for the cylinder through which a connecting rod extends. The piston is rotatable within the limits defined by the recess in the cover when the lower dog is withdrawn from the recess in the base, but not otherwise. Hydraulic means are provided to move the piston axially and rotationally between clamping and releasing positions.

7 Claims, 5 Drawing Figures

HYDRAULIC CLAMPING APPARATUS

BACKGROUND OF THE INVENTION

The present invention relates to hydraulically controlled apparatus clamping work pieces which are to be processed on machine tools and the like.

It is known that apparatus of this kind comprise a clip or other clamping element fixed on the end of a rod which is operated hydraulically so that the element is displaced angularly before moving downwards to bear against the part which is to be held, whilst the process is carried out in the opposite sense in order to unclamp the part: namely, the element has first of all to move upwards before pivoting at the upper end of its travel in order to release the part completely.

It is an aim of the present invention to provide a clamping apparatus of the general type specified above but which requires only a small number of component parts. It is another aim of the invention to enable these parts to be easily manufactured in series production.

SUMMARY OF THE INVENTION

According to the present invention, hydraulically controlled apparatus for selectively clamping a work piece has a body; a clamping element associated with a piston movable in the body, the piston having transverse and longitudinal surfaces adapted to be subjected to hydraulic pressure causing axial and angular displacement of the piston to clamp or unclamp a said work piece; and a mechanical locking mechanism interposed between the piston and the body, the mechanism comprising dogs and recesses formed on the piston and body, mutual engagement of which locks the piston in a give angular orientation with respect to the body at one of the end points of the axial travel of the piston.

The body of the apparatus preferably comprises a cylinder formed with an axial bore and provided at one end with a closed base, and at the other with a cover having an opening therein for the axial passage of a rod connecting the clamping element to the piston. The base conveniently comprises a cylindrical projection extending into the cylinder and is formed with at least one recess adapted to receive a complementary dog formed on the piston in the locked positon. It is usual to provide a pair of dogs for engaging a corresponding pair of recesses.

Hydraulic means for moving the piston axially from the locked position and then rotationally to the release position in preferred embodiments comprises ducts formed in the body for directing hydraulic fluid against transverse and longitudinal faces of the piston in such a way as to impart the sequential movement. One or more other ducts are provided to effect sequential rotational and axial movement of the piston to the locked position whereby hydraulic fluid under pressure may be selectively redirected to a chosen duct to effect the desired change.

BRIEF DESCRIPTION OF THE DRAWINGS

The invention will be better understood by reference to the accompanying drawings which show, by way of example a preferred embodiment thereof. In the drawings.

DESCRIPTION OF PREFERRED EMBODIMENT

Figure 5:
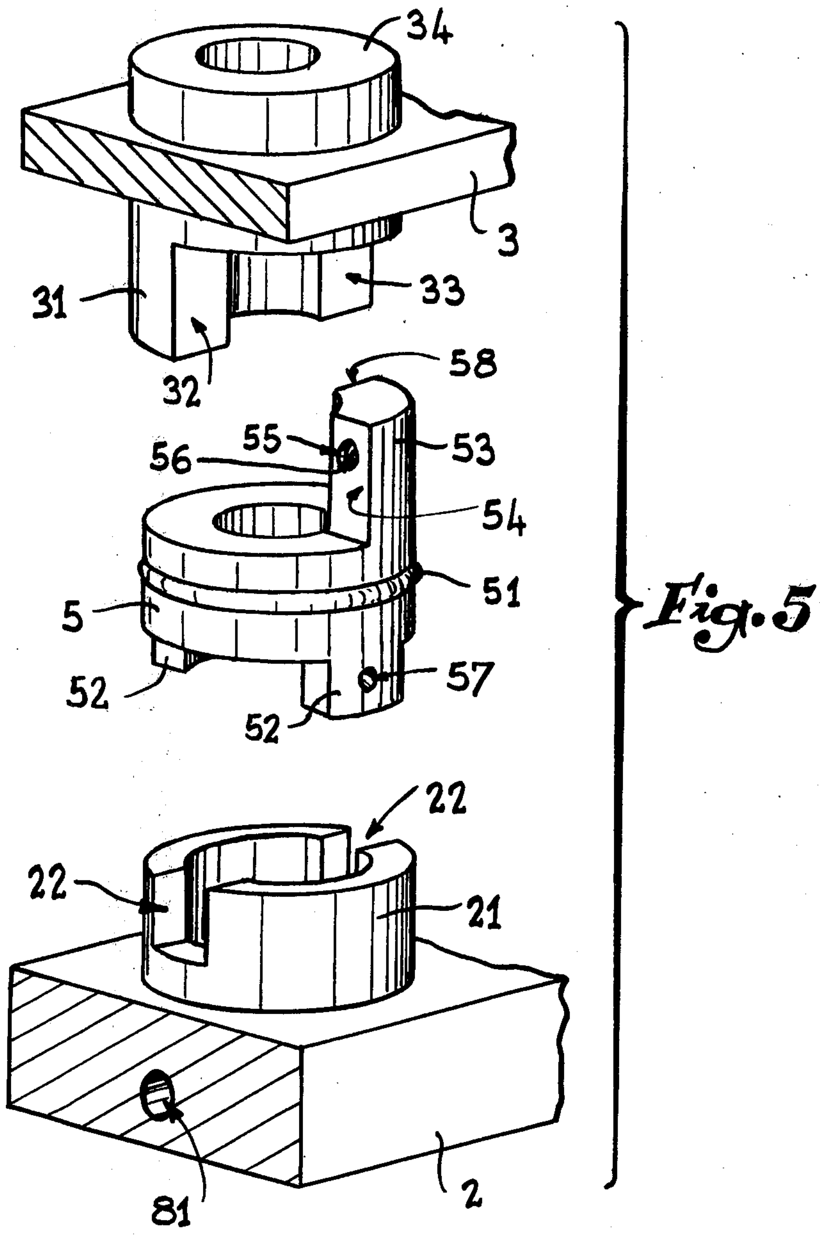
FIG. 5 is an exploded perspective view showing the main component parts of the apparatus of the preceding figures.

The body of the clamping apparatus illustrated comprises essentially a massive cylinder 1 provided at its ends with a base 2 and a cover 3, these three parts being assembled together by means of screws such as 4. As is shown more particularly in FIG. 5, the upper face of the base 2 is integral with a cylindrical projection 21 which is engaged with as small a clearance as possible within the lower mouth of the axial bore 11 of the cylinder 1; this projection 21 is cut into to form two recesses 22 which are situated diametrally opposite one another. In the same way the lower face of the cover 3 comprises a cylindrical projection 31 arranged at the diameter of the axial bore 11, this projection 31 being cut into a recess extending over 180° so as to define two flat surfaces 32 and 33 directed in the same vertical plane; opposite from the projection 31 the cover 3 comprises a cylindrical extension 34.

Within the bore 11 there is mounted a piston 5 whose sealing-tightness in axial sliding is ensured by a sealing ring 51. Towards the lower end this piston 5 is provided with two dogs 52 diametrally opposite one another and dimensioned so as to come to engage without any substantial clearance within the recesses 22. Opposite there is provided a vertical extension 33 in the form of a sector extending over 90°; on one of the lateral flat surfaces (given the reference numeral 54), of this sector 53 there is arranged a cavity 55 forming a mouth for an elbowed duct 56 which extends vertically through the piston 5 and opens into the lower face of the said piston.

The apparatus also comprises a rod 6 guided within projections 34 and 31 of the cover 3 and extending axially through the piston 5 with which it is made integral by means of a pin 7 engaged on the one hand within perforations 57 provided in the dogs 52, and on the other hand through a bore provided diametrally in the widened base 61 of the aforesaid rod. The end of the rod which projects above the cover 3 is integral angularly and axially with a clamping clip or strap 62 which is arranged to be interchangeable.

The hydraulic operation of the apparatus is carried out by means of a pump and a distributor, the latter being connected to the base 2 by two conduits 8 and 9. The conduit 8 communicates with an elbowed duct 81 which opens longitudinally into the interior of the projection 21; in the same way there is associated with the conduit 9 a duct 91 which goes up into the thickness of the base 2 and the cylinder 1 and terminates, through a lateral cavity 92, within the bore 11, substantially at the level of the flat surface 33 of the cylindrical projection 31 of the cover 3.

Figure 1:
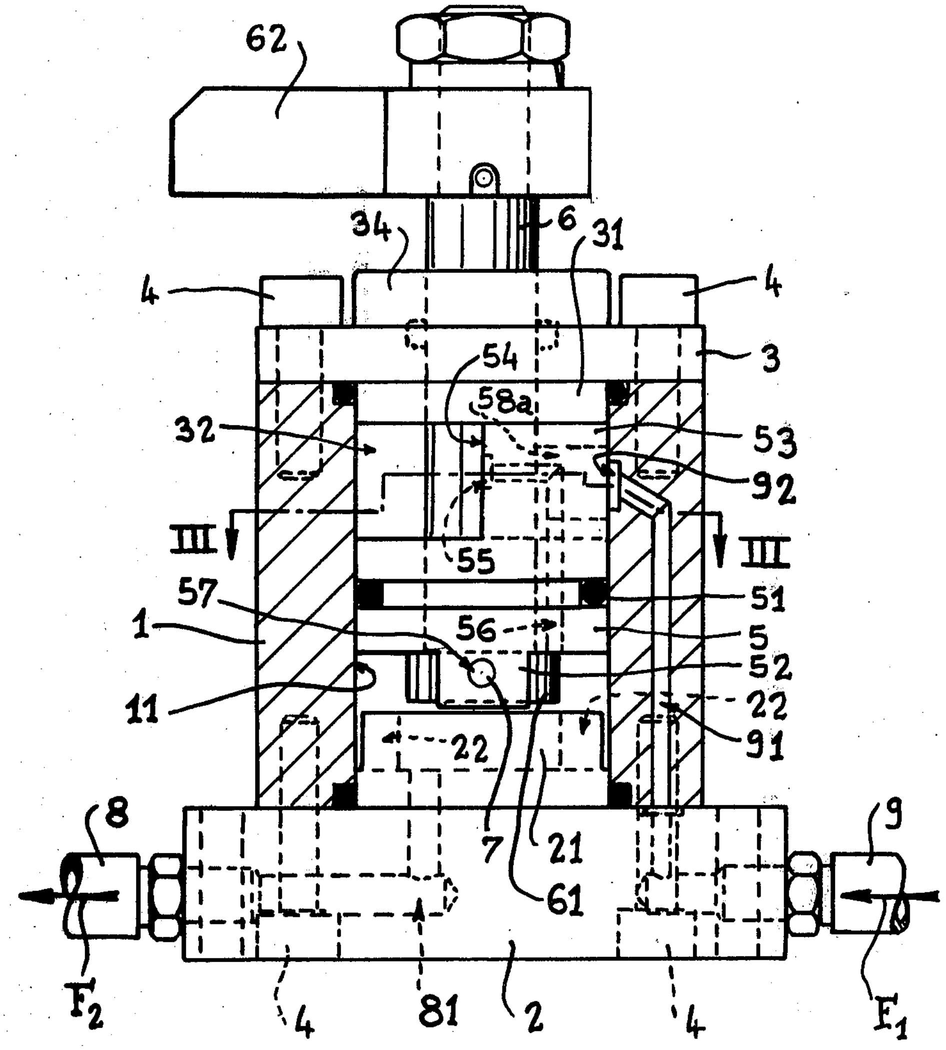
FIG. 1 is an axial diagrammatic sectional view of a clamping apparatus embodying the present invention, the clamping element being shown in the upper, unclamping position.
Figure 3:
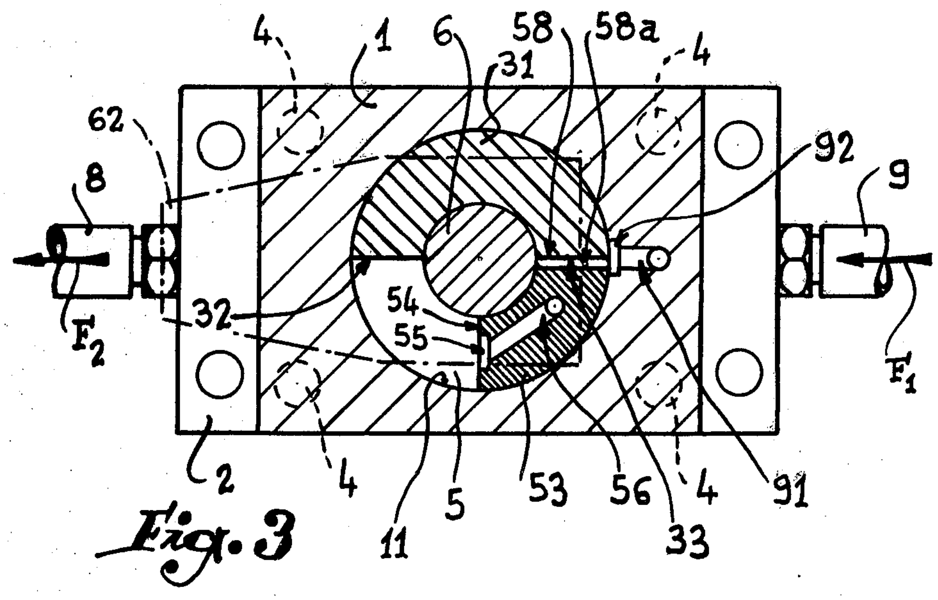
FIGS. 3 and 4 are cross-sectional views taken on planes indicated at III—III (FIG. 1) and IV—IV respectively (FIG. 2).

To explain the operation of the apparatus described hereinbefore it will be assumed first of all that the clip or strap 62 and the rod 6 are in the upper position illustrated in FIGS. 1 and 3. Once the part to be clamped is positioned on the machine tool or the like, the operator operates the hydraulic distributor so that the conduit 9 is connected to the delivery under pressure of the pump whereas the conduit 8 is connected to the installation tank (arrows F1 and F2 in FIGS. 1 and 3). Under these circumstances, the hydraulic pressure acts through the duct 91 on the surface 58 of the sector 53 (this flat surface is provied for this purpose with a central clearance 58*a*), and the said sector is thus displaced in an angular manner through 90°. It will be noted that during this rotational movement the piston 5 cannot be displaced axially since the dogs 52 are applied against the upper edge of the projection 21; only at the end of the angular travel of the sector 53 and the piston 5 do the dogs 52 come to be situated above the recesses 22. Then the pressure which is exerted on the upper face of the piston 5 causes the latter and the rod 6 to move downwards, the hydraulic fluid escaping through the duct 81 and the conduit 8.

Figure 2:
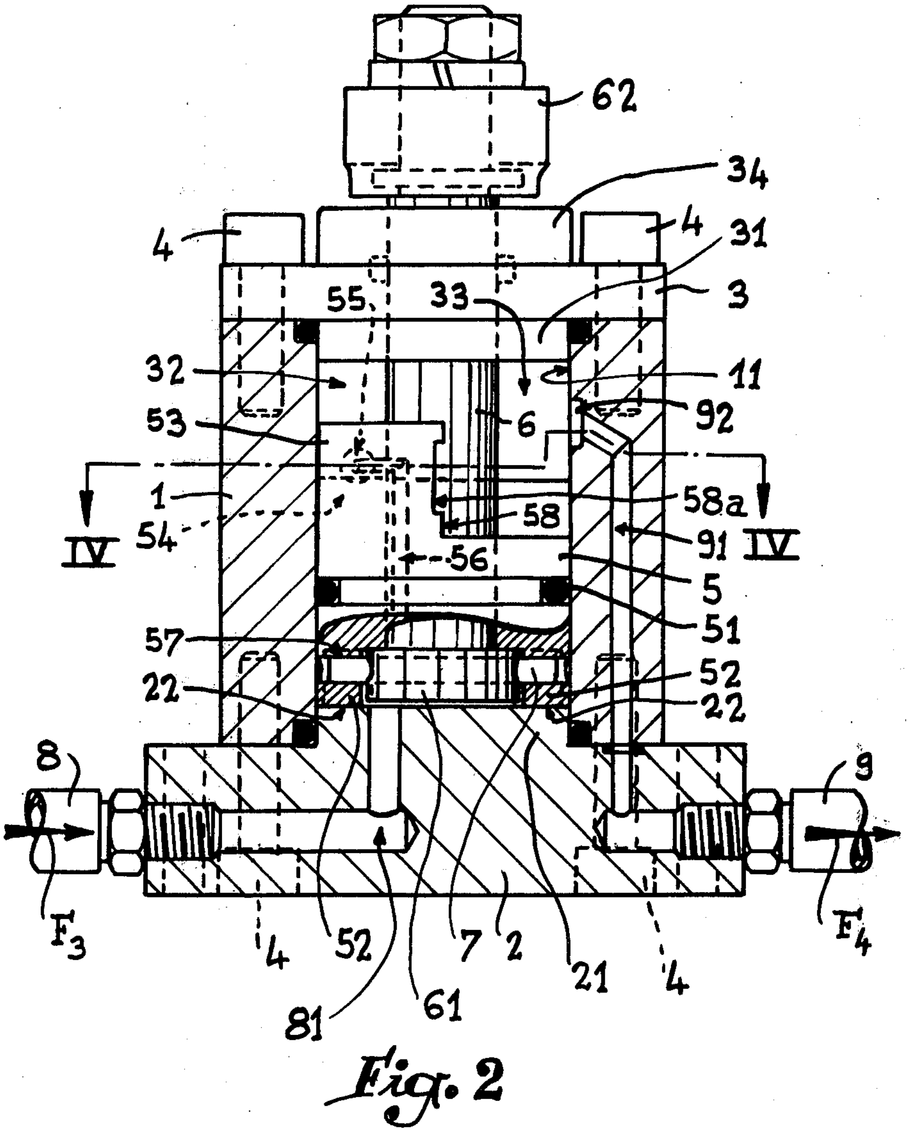
FIG. 2 is a view similar to FIG. 1 with the clamping element in the lower position.
Figure 4:
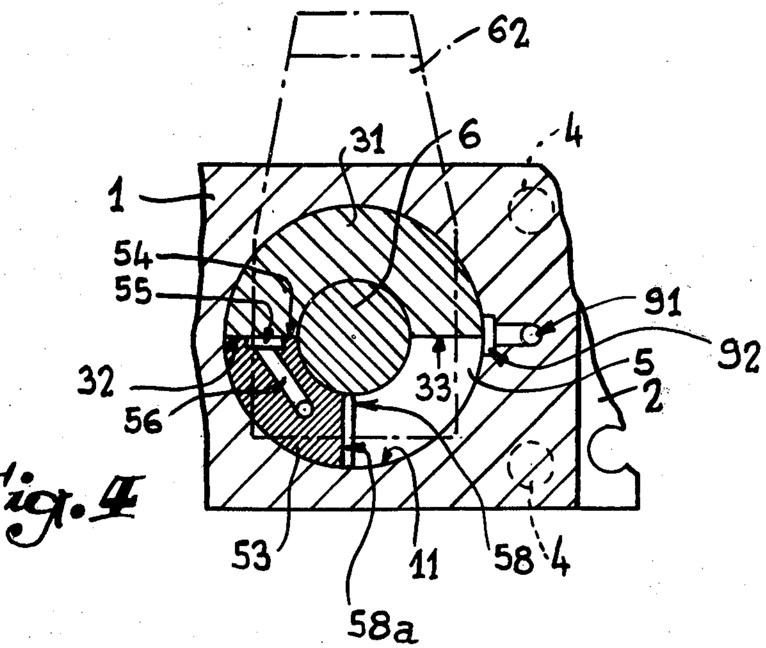

Consequently, the clip 62 has been rotated, then slid axially in the direction of clamping, and the situation is the lower position shown in FIGS. 2 and 4.

In order to effect the unclamping of the part being treated, all that has to be done is to again operate the distributor in order to connect the conduit 8 to the delivery side of the pump and the conduit 9 to the tank (arrows F3 and F4 in FIG. 2). The pressure acts on the base 61 of the rod 6 and the lower face of the piston 5 through the duct 81, and also on the surface 32 of the projection 31 through the duct 56, but it is only when the piston 5 has moved upwards sufficiently to release the dogs 52 out of the recesses 22 that it can be displaced angularly to return to the initial upper position. The two movements of the clip 61 required for unclamping are therefore effected in succession in the required order.

The apparatus according to the invention comprising a small number of parts, the machining of which does not present any considerable difficulty, which is a difference relatively to conventional constructions wherein the piston and its rod co-operate with a drum in order to form an assembly similar to a hydraulic distributor. Therefore, the originality of the apparatus provided by the present invention resides in the mechanical angular locking of the piston 5, this locking being obtained by engagement of the dogs 52 in the recesses 22 of the projection 21.

It should also be understood that the foregoing description has been given only by way of example and that it would not in any way constitute a departure from the framework of the invention to replace the constructional details described by any other equivalent details. It will be apparent that the pivoting angle of the clip 62 may be greater than or less than 90°. For this purpose it is sufficient to modify the angle of the recess formed in the projection 31. It will also be appreciated that the cover 3 is capable of being arranged to fix the apparatus in position instead of the base 2. Finally, the rotation of the clip may be carried out equally well towards the left as towards the right.

We claim:

1. Hydraulically controlled apparatus for selectively clamping a work piece having a body; a clamping element associated with a piston movable in the body, the piston having transverse and longitudinal surfaces adapted to be subjected to hydraulic pressure causing axial and angular displacement of the piston to clamp or unclamp a said work piece; and a mechanical locking mechanism interposed between the piston and the body, the mechanism comprising dogs and recesses formed on the piston and body, mutual engagement of which locks the piston in a given angular orientation with respect to the body at one of the end points of the axial travel of the piston.

2. Apparatus according to claim 1 wherein the said dogs are formed on the piston and wherein the said recesses are formed in the body.

3. Apparatus according to claim 1 wherein the body comprises a cylinder formed with an axial bore and provided at one end with a closed base, and at the other with a cover having an opening therein, for the axial pressure of a rod connecting the clamping element to the piston.

4. Apparatus according to claim 3 wherein the base comprises a cylindrical projection engaged within the mouth of said axial bore and having at least one recess formed therein for co-operating with a corresponding dog formed on the bottom end of the piston.

5. Apparatus according to claim 3 wherein the base and cylinder define a duct communicating a hydraulic supply conduit with the axial bore of the cylinder to enable hydraulic pressure from the supply conduit to act on a longitudinal small face of the piston.

6. Apparatus according to claim 3 wherein the base defines a duct communicating a hydraulic supply with a lower portion of the axial bore of the cylinder to enable hydraulic pressure from the supply conduit to act on the corresponding transverse face of the piston, and wherein the piston defines, a longitudinal duct extending from said face to a space defined between longitudinal faces on the piston and cover whereby said hydraulic pressure imparts a rotational movement of the piston relative to the body.

7. Hydraulically controlled apparatus for selectively clamping a work piece having a body comprising a base and a cylinder formed with an axial bore extending therefrom with a cover closing the cylinder, the cover having an opening therein; a rod connected to a clamping element extending through said opening to a piston having a dog formed on either end thereof and being movable in the cylinder, wherein the base comprises a cylindrical projection with the cylinder and has a first recess of a first peripheral extent formed therein adapted to receive the first dog formed on one end of the piston; and wherein the cover comprises a cylindrical projection within the cylinder and has a second recess of peripheral extent greater than that of the first recess, adapted to receive the second dog on the other end of the piston, the piston being axially movable to engage and withdraw the first dog into and from the first recess, and rotatable between a position where the first dog is aligned with but withdrawn from the first recess and a position at which the first dog is not so aligned, such rotation being possible with the second dog engaged in the second recess, the apparatus further comprising hydraulic means for imparting hydraulic pressure to longitudinal and transverse faces of the piston, base and cover to effect movement of the piston between said positions.

* * * * *